United States Patent
Xu

[19]

[11] Patent Number: 6,157,089
[45] Date of Patent: Dec. 5, 2000

[54] SWITCHING CONFIGURATION FOR ELECTRICAL CONTROL DEVICES

[75] Inventor: Chihao Xu, München, Germany

[73] Assignee: Infineon Technologies AG, Munich, Germany

[21] Appl. No.: 09/363,265

[22] Filed: Jul. 29, 1999

Related U.S. Application Data

[63] Continuation of application No. PCT/DE98/00243, Jan. 27, 1998.

[30] Foreign Application Priority Data

Jan. 29, 1997 [DE] Germany .......................... 197 03 236

[51] Int. Cl.[7] ................................................ B60L 11/18
[52] U.S. Cl. .................... 307/9.1; 307/10.1; 307/38; 324/503; 361/87; 370/386; 370/438
[58] Field of Search ............................ 307/10.1, 38, 39, 307/40, 9.1; 361/86, 87; 370/386, 422, 438; 324/503, 512; 222/522

[56] References Cited

U.S. PATENT DOCUMENTS

| | | | |
|---|---|---|---|
| 3,697,767 | 10/1972 | Fioravanti . | |
| 4,639,609 | 1/1987 | Floyd et al. | 307/10.1 |
| 4,819,117 | 4/1989 | Brennen et al. | 361/86 |
| 5,859,845 | 1/1999 | Oniishi et al. | 370/386 |
| 5,990,570 | 11/1999 | Yoshida et al. | 307/10.1 |

FOREIGN PATENT DOCUMENTS

| | | |
|---|---|---|
| 0128574A2 | 6/1983 | European Pat. Off. . |
| 0193485A1 | 9/1986 | European Pat. Off. . |
| 2409660 | 9/1975 | Germany . |
| 3930153A1 | 3/1991 | Germany . |
| 9305530 | 7/1994 | Germany . |
| 19518522A1 | 11/1996 | Germany . |
| 2277618A | 11/1994 | United Kingdom . |

OTHER PUBLICATIONS

"Halbleiterkonzepte für die Automobilelektronik", Hans–Wilhelm Wolff, 2421 Radio Fernsehen Elektronik, Dec. 1992, No. 12, Berlin, Germany, pp. 838–841.

*Primary Examiner*—Albert W. Paladini
*Attorney, Agent, or Firm*—Herbert L. Lerner; Laurence A. Greenberg; Werner H. Stemer

[57] ABSTRACT

A switching configuration for electrical control devices, in particular for use in control devices of an electrical system of power-driven vehicles is disclosed. The switching configuration includes a busline with a defined thermal conductivity and a defined heat capacity, which is connected with a first predefined power supply potential. The switching configuration has a plurality of switching devices for switching on and off at least one associated load of a respective switching device, for each of which a first current-conducting connection of the switching device is connected with the busline with a defined thermal conductivity and a heat capacity. Whereby each load of a respective switching device is connected between a second current-conducting connection of the switching devices and a second predefined power supply potential.

10 Claims, 2 Drawing Sheets

SWITCHING CONFIGURATION FOR ELECTRICAL CONTROL DEVICES

CROSS-REFERENCE TO RELATED APPLICATION

This application is a continuation of copending International Application PCT/DE98/00243, filed Jan. 27, 1998, which designated the United States.

BACKGROUND OF THE INVENTION

Field of the Invention

The invention concerns a switching configuration for electrical control devices, which is provided in particular for use in control devices in electrical systems of power-driven vehicles.

In modern power-driven vehicles there is a steady increase in the number of electrical components, e.g. electric motors, generators, etc., and electronic components, e.g. actuators, sensors, etc. Components of this kind increase the size and complexity of the electrical system so drastically that the former usual method of connecting individual loads over a cable harness presents greater and greater problems and is associated with an almost unmanageable outlay.

For this reason there has been a change in recent years towards controlling the loads over digital, computerized systems in which a large number of lines, i.e. the cable harness, is replaced by a bus to which the control circuits of the respective loads are connected.

In systems of that kind, all that the load requires in principle in addition to the bus connection is a switchable connection to a power supply. Switching the power supply for the load is usually carried using power semiconductors, such as transistors and thyristors, and presents a considerable challenge in these digital computerized systems.

The higher the current to be switched, the greater are the associated problems in respect to thermal and electrical losses. Modern power-driven vehicles possess a large number of high-current loads, e.g. cooling fan, rear window heating, starter, catalyzer heating, etc.

Furthermore, the switches used for switching the loads should not only perform the usual on/off function but should also possess a degree of artificial intelligence, i.e. be capable of detecting short circuits, interruptions, electrical or thermal overloads, etc., and of carrying out suitable diagnostic functions in order that effective protection against overload is possible. Through communication of that kind of status information to the control system, malfunctions can be detected and appropriate responses can be initiated in order to protect the load, the battery and the switch itself from damage.

The switches currently used are divided into high side and low side switches depending on the mutual configuration of the load and the power supply. The components used for them are generally MOS transistors with power and logic elements integrated in a common substrate.

In the following, intelligent high side MOS switches are brought in for description without any limitation of generality.

The switches for high-current loads must be very low-impedance in order to keep heat development within limits. The use of vertical n-channel MOSFETs is therefore advantageous. In the assembled state the drain connection of these components is generally connected to the chip carrier, also known as leadframe, which is in turn connected with the positive pole of the supply voltage.

One possibility of arranging high side MOS switches of that kind consists of providing a central switch for the power supply and to add to it connected in series respective switches for corresponding high-current and low-current loads.

A central switch of this kind is accompanied by disadvantages insofar as the costs and the series resistance—and therefore the associated power loss—are high. Apart from that, the threshold for short detection is very large for a central switch since it is not possible to differentiate a "soft", i.e. high-impedance, short from the activation of several normal loads.

From Published, Non-Prosecuted German Patent Application DE 24 09 660 A1 an electrical switching, control and/or regulating device for electrical equipment in a power-driven vehicle is known with a housing for pluggable switching elements, in particular relays, which are disposed adjacently and which have output plug contacts. At distribution lines or buslines, mating plug contact components are located which can accept the output plug contacts of the relays. The distribution lines or buslines, which can be realized as a busbar, serve to provide power to the switching contacts of the relays. In addition, every relay is allocated a fuse that is realized as a pluggable switching.

SUMMARY OF THE INVENTION

It is accordingly an object of the invention to provide a switching configuration for electrical control devices that overcomes the above-mentioned disadvantages of the prior art devices of this general type, which switching configuration enables effective heat dissipation and can be realized at reasonable cost. In particular, it is intended to create without the use of separate fuses a reliable possibility of limiting current flow in the case of excess current.

With the foregoing and other objects in view there is provided, in accordance with the invention, in an electrical system of a power-driven vehicle having a control device and a battery with a first predefined supply potential, a second predefined supply potential, and a battery pole, a switching configuration for use in the control device, the switching configuration including:

a busline connected to the first predefined supply potential of the battery of the power-driven vehicle;

a central control unit outputting a switching control signal; and a plurality of switching devices for switching on and off at least one load associated with each of the plurality of switching devices, each of the plurality of switching devices having a first current-conducting connection directly connected to the busline and a second current-conducting connection connected through the at least one load to the second predefined supply potential of the battery, each of the plurality of switching devices having a power MOSFET and a control circuit controlling the power MOSFET, the control circuit receiving and controlled by the switching control signal generated by the central control unit, the control circuit outputting a status signal dependent on a current flow, and the central control unit receiving and evaluating the status signal and limiting the current flow through the power MOFSET in dependence on the status signal.

A particular advantage of the switching configuration to the invention is the fact that the drain connection of each power circuit-breaker can be coupled with the chip carrier (leadframe), both electrically and thermally, in such a way that the electrical and thermal resistance are minimal.

In configuring the busline it is possible to take into account that the operating duration of the loads is frequently limited and that, in general, not all loads are active simultaneously. Thus the heat loss arising in the power circuit-breakers can be estimated beforehand and a busline with appropriate thermal conductivity and heat capacity can be provided which stores the heat lost and passes this on to the battery and the surroundings. In this way the total heat balance for the power circuit-breakers can be optimized.

In addition, the total cable length for the power circuit-breakers can be made shorter because there is no detour involved through the respective power circuit-breakers as these are disposed very close together.

According to a preferred further embodiment the first predefined power supply potential is the positive battery voltage and the second predefined power supply potential is the negative battery voltage, in particular the ground potential. In this case the embodiment is a high side switching configuration, however, the invention is also applicable to low side switching configurations.

According to a further preferred embodiment a single load is assigned to a single switching device if the current load of the load exceeds a predefined value. Typical values for such a predefined value are up to several hundred amperes.

According to a further preferred embodiment several loads connected in parallel are assigned to a single switching device if the current load of the loads does not exceed a predefined value. Analogously to the previous case, typical values for such predefined values are below approximately ten amperes.

According to a further preferred embodiment a multiplexer/demultiplexer device is provided for connecting the control circuits of the switching devices with a central control unit. This enables the switching control signals and status signals to be transmitted multiplexed over a single busline and to be demultiplexed at the switching configuration, which reduces the number of cables in particular if the central control unit is provided at a distance from the switching configuration. This last situation occurs, for example, if at least two switching configurations are provided at two different positions in the power-driven vehicle, e.g. one in the trunk and one in the engine compartment, together with a central control unit in the driver compartment.

According to a further preferred embodiment the buslines with defined thermal conductivity and heat capacity are contained inside a joint switchgear housing. It is advantageous if the control circuits and the multiplexer/demultiplexer device are also contained within a joint switchgear housing, if present.

According to a further preferred embodiment the busline with defined thermal conductivity and heat capacity is attached directly to one pole of the battery. The poles of the battery advantageously offer high mechanical stability for connecting the busline and also a high heat capacity.

According to a further preferred embodiment the busline with the defined thermal conductivity and heat capacity is a metal busbar. However, additional cooling devices can be added as necessary, in particular cooling fans.

Other features which are considered as characteristic for the invention are set forth in the appended claims.

Although the invention is illustrated and described herein as embodied in a switching configuration for electrical control devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
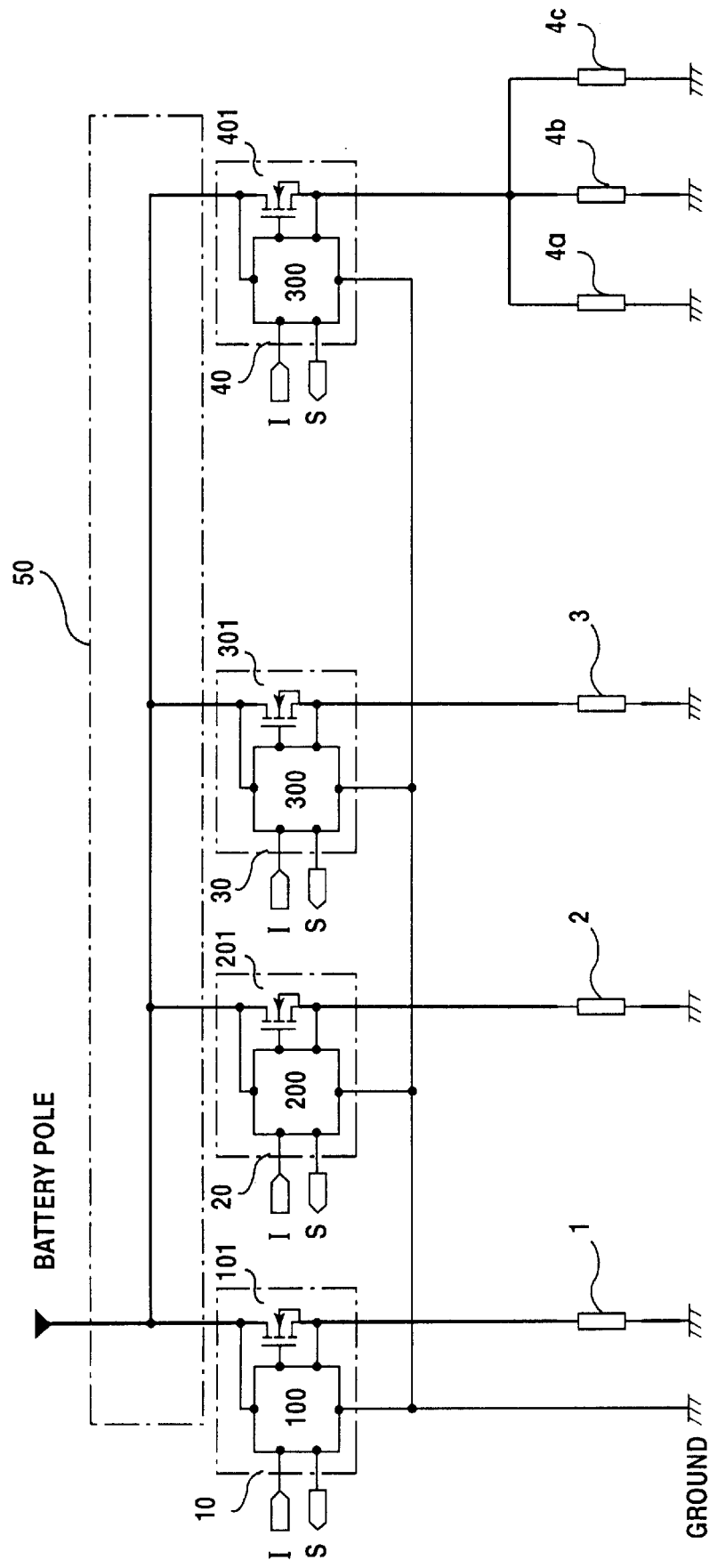
FIG. 1 is a diagrammatic, block circuit diagram of a first preferred embodiment according to the invention.

In all the figures of the drawing, sub-features and integral parts that correspond to one another bear the same reference symbol in each case. Referring now to the figures of the drawing in detail and first, particularly, to FIG. 1 thereof, there are shown high-current loads 1, 2, and 3, i.e. a load whose current load lies above a predefined value of typically several amperes.

The high-current loads 1, 2, and 3 are connected, on the one hand, with a ground potential, i.e. a negative battery connection, and, on the other hand, over an associated high side switching device 10, 20 and 30 respectively with a positive battery connection. Each of the switching devices 10, 20 and 30 is connected through its current-conducting connection to a metal busbar 50 of suitable length and thickness.

In FIG. 1 each of the reference numbers 4a, 4b and 4c refers to a low-current load, i.e. a load whose current load lies below a predefined value of typically less than one ampere.

The low-current loads 4a, 4b and 4c are connected, on the one hand, with the ground potential and, on the other hand, with the positive battery connection over a high side switching device 40 associated with all three of them. The switching device 40 is also connected through a current-conducting connection to the metal busbar 50.

Each of the switching devices 10, 20, 30 and 40 consists of a vertical n-channel MOSFET 101, 201, 301 and 401 respectively and a control circuit 100, 200, 300 and 400 respectively, which are advantageously provided in the same substrate.

The control circuits 100, 200, 300 and 400 serve to switch on and off the associated vertical n-channel MOSFET 101, 201,301 and 401 respectively in response to a respective switching control signal I, and to record a current flow through the respective associated vertical n-channel MOFSET 101, 201, 301 and 401 and to issue a status signal S.

The switching control signals I come from a central control unit to which the status signal S is also led, which can provide communication with the loads and even communication between the loads themselves. If a critical load, e.g. an electric brake, is activated, a less critical load, e.g. a catalyzer heating, can be switched off during this time. The electrical system, i.e. a voltage of the electrical system, thereby remains stable and does not break down as a result of excessive loading.

The switching devices 10, 20, 30 and 40 are all connected in parallel and make it possible to connect every high-current load 1, 2 and 3, and the group of low-current loads 4a, 4b and 4c regarded jointly as a high-current load, directly with the positive battery connection.

The configuration of the respective switching devices 10, 20, 30 and 40 can be adapted to the one or more load(s), as can the short circuit threshold, i.e. the value of the current at which the status signal S communicates to the central control unit a short at the relevant load and the current through the circuit-breaker is restricted.

The particular advantage of the first embodiment consists therein that drain connections of the switching devices 10, 20, 30 and 40 can be connected with the positive connection of the battery or power supply over the metal busbar 50 alone, i.e. a single metal component with suitable mechanical and thermal characteristics. It is advantageous if the metal busbar 50 is connected directly with the positive connection of the battery or power supply.

Preferred in particular is that the switching devices 10, 20, 30 and 40 and the metal busbar 50 form the core of a housing for the control device for the electrical system of a power-driven vehicle.

Figure 2:
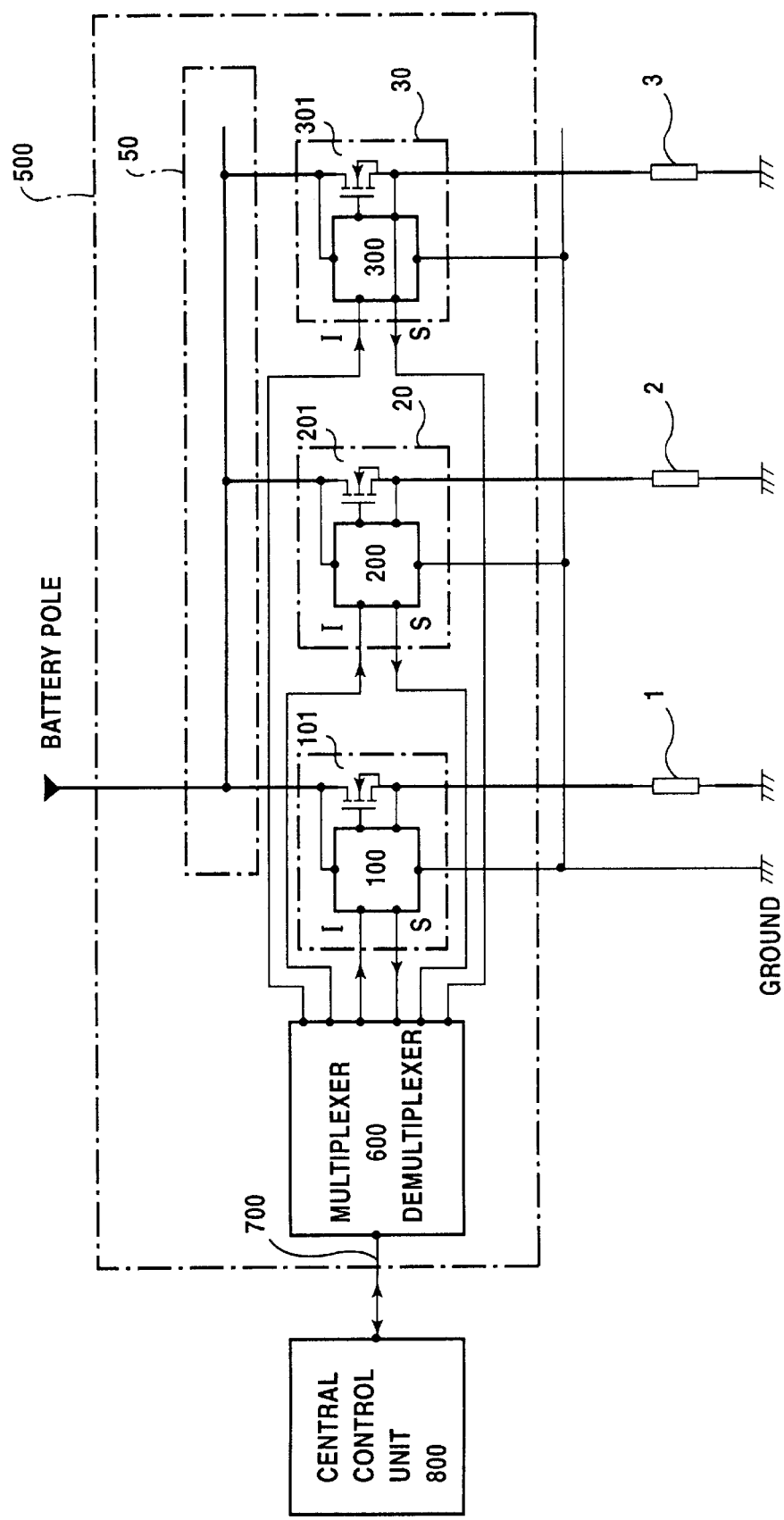
FIG. 2 is a block circuit diagram of a second preferred embodiment.

FIG. 2 shows a circuit diagram of a second preferred embodiment of the invention.

In FIG. 2 the reference numbers 1, 2 and 3 once again indicate the high-current loads, i.e. a load whose current load lies above a predefined value of typically several amperes.

The high-current loads 1, 2 and 3 are connected, on the one hand, with ground potential, i.e. the negative battery connection, and, on the other hand, over the associated high side switching device 10, 20 and 30 respectively with the positive battery connection. Each of the switching devices 10, 20 and 30 is connected through its current-conducting connection to the metal busbar 50 of suitable length and thickness.

The construction and function of the switching devices 10, 20 and 30 correspond with those that were explained with reference to FIG. 1.

A multiplexer/demultiplexer device 600 is provided for connecting the control circuits 100, 200 and 300 and the respective switching devices 10, 20 and 30 with a central control unit 800.

The switching devices 10, 20 and 30, the metal busbar 50 and the multiplexer/demultiplexer device 600 are all contained in a joint switchgear housing 500 which has suitable feedthroughs for the necessary connections.

The central control unit 800 is usually located apart from the control device for the electrical system. As a result, the different switching devices 10, 20 and 30 would need a large number of cables for the switching control signals I and the status signals S in order to provide the connection with the central control unit 800. This would exert an undesirable effect on the complexity and the costs.

The second embodiment of the invention avoids this problem through the multiplexer/demultiplexer device 600 inside the switchgear housing 500 in the vicinity of the switching devices 10, 20 and 30.

The switching control signals I are multiplexed in the central control unit 800 and transmitted over a busline 700 to the multiplexer/demultiplexer device 600 in the switchgear housing 500 where they are demultiplexed and transmitted to the appropriate switching device 10, 20 or 30.

In the other direction, the status signals S are multiplexed in the multiplexer/demultiplexer device 600 in the switchgear housing 500 and transmitted over the busline 700 to the central control unit 800 where they are demultiplexed and evaluated, and any necessary actions are implemented by the central control unit 800, e.g. in the event of a short circuit.

In addition to the advantages of the first embodiment, the number of cables is especially reduced in the second embodiment of the invention if the central control unit 800 is provided at a distance from the switching configuration.

This invention is not restricted to the two embodiments described above.

In particular, the number of switching devices belonging to a switching configuration can be adapted to the specific application. In addition, several switching configurations according to the invention can be provided at different positions in the power-driven vehicle and be connected over multiplexer/demultiplexer devices with one or more control devices.

I claim:

1. In an electrical system of a power-driven vehicle having a control device and a battery with a first predefined supply potential, a second predefined supply potential, and a battery pole, a switching configuration for use in the control device, the switching configuration comprising:

a joint switch gear housing;

a busline connected to the first predefined supply potential of the battery of the power-driven vehicle;

a central control unit outputting a switching control signal;

a plurality of switching devices for switching on and off at least one load associated with each of said plurality of switching devices, each of said plurality of switching devices having a first current-conducting connection directly connected to said busline and a second current-conducting connection connected through the at least one load to the second predefined supply potential of the battery, each of said plurality of switching devices having a power MOSFET and a control circuit controlling said power MOSFET, said control circuit receiving and controlled by the switching control signal generated by said central control unit, said control circuit outputting a status signal dependent on a current flow, said central control unit receiving and evaluating the status signal and limiting the current flow through said power MOFSET in dependence on the status signal;

said busline being disposed with said power MOSFET of each of said plurality of switching devices inside of said joint switch gear housing; and said busline having a thermal conductivity and a heat capacity sufficient for storing a heat energy dissipated by said switching devices during a limited operation duration when the current flow is present.

2. The switching configuration according to claim 1, wherein the first predefined supply potential is a positive battery voltage and the second predefined supply potential is a negative battery voltage.

3. The switching configuration according to claim 2, wherein the negative battery voltage is a ground potential.

4. The switching configuration according to claim 1, wherein each of said plurality of switching devices is associated with a single load if a current load of the single load exceeds a predefined value.

5. The switching configuration according to claim 1, wherein each of said plurality of switching devices is associated with several loads connected in parallel if a current load of the several loads does not exceed a predefined value.

6. The switching configuration according to claim 1, including a multiplexer/demultiplexer device connecting said control circuit of each of said plurality of switching devices to said the central control unit.

7. The switching configuration according to claim 1, wherein said control circuit of each of said plurality of switching devices is contained within said joint switch gear housing.

8. The switching configuration according to claim 7, including a multiplexer/demultiplexer device connecting said control circuit of each of said plurality of switching devices to said the central control unit, said multiplexer/demultiplexer device disposed within said joint switchgear housing.

9. The switching configuration according to claim 1, wherein said busline has a defined thermal conductivity and a defined heat capacity and is connected directly at the battery pole.

10. The switching configuration according to claim 1, wherein said busline is a metal busbar with a defined thermal conductivity and a defined heat capacity.

* * * * *